Figure 1:
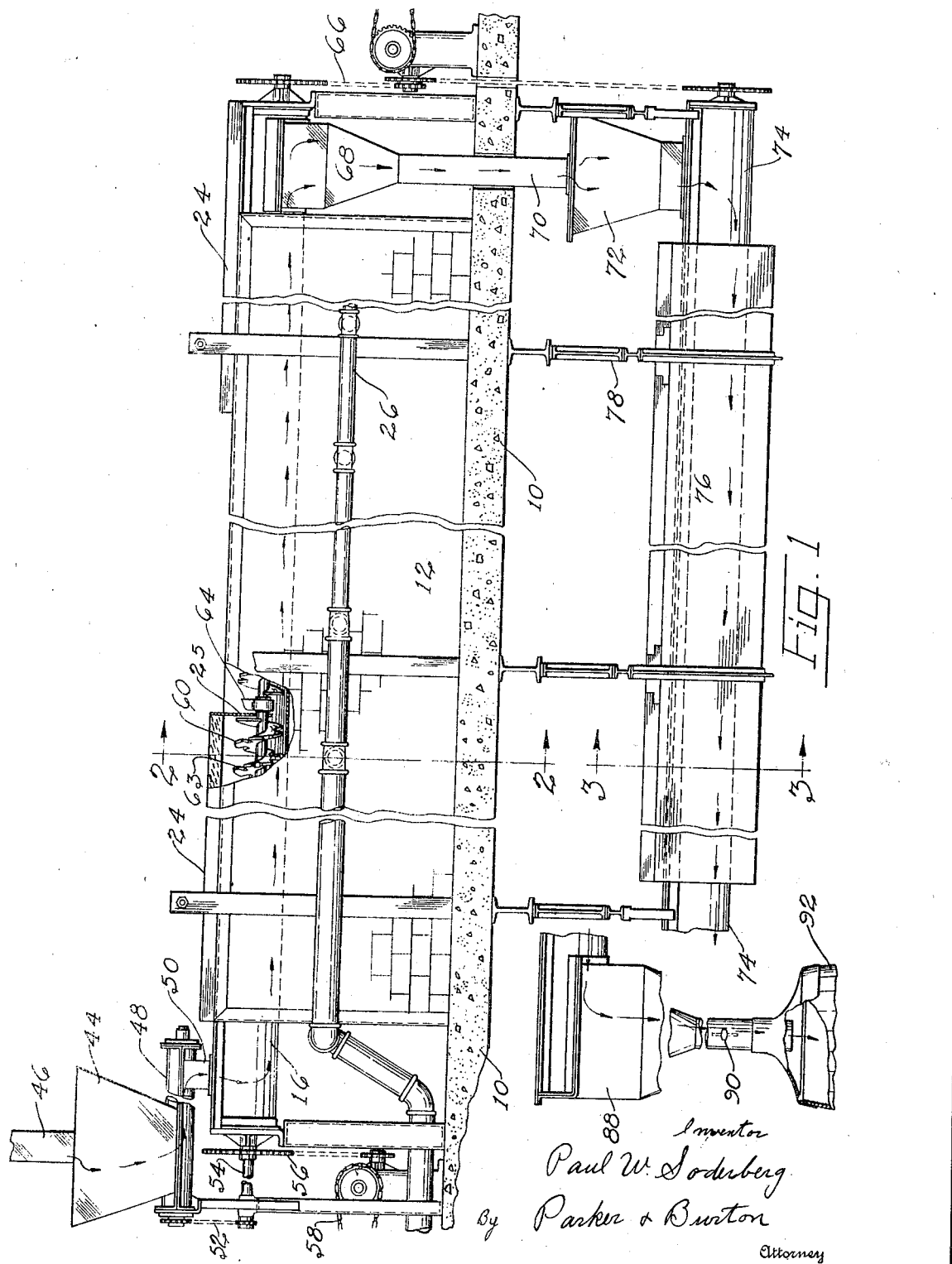

Aug. 13, 1940.       P. W. SODERBERG       2,211,734
APPARATUS FOR PRODUCING ALKALI SILICATES
Original Filed March 18, 1939    2 Sheets-Sheet 1

Inventor
Paul W. Soderberg
By Parker & Burton
Attorney

Aug. 13, 1940.　　　P. W. SODERBERG　　　2,211,734
APPARATUS FOR PRODUCING ALKALI SILICATES
Original Filed March 18, 1939　　2 Sheets-Sheet 2

Inventor
Paul W. Soderberg
By Parker & Burton
Attorney

Patented Aug. 13, 1940

2,211,734

UNITED STATES PATENT OFFICE 2,211,734

APPARATUS FOR PRODUCING ALKALI SILICATES

Paul W. Soderberg, Wyandotte, Mich., assignor to The J. B. Ford Company, Wyandotte, Mich., a corporation of Michigan Original application March 18, 1938, Serial No. 196,713. Divided and this application June 11, 1938, Serial No. 213,285

5 Claims. (Cl. 23—277)

This invention relates to an improved alkali reaction chamber, or more particularly to improved apparatus for producing dry granular alkali silicates or other similar alkali reaction products by chemical reaction resulting from heat. It constitutes a division of my application Serial No. 196,713, filed March 18, 1938.

An object is to provide improved alkali reaction chamber appaartus whereby dry comminuted alkali silicates or other dry comminuted alkali reaction products may be produced by chemical reaction resulting from heat, rapidly, economically, and as a continuous operation.

An important characteristic of the alkali reaction products produced with my improved apparatus is that they are of exceptionally high purity and, if desired, they may be produced in an anhydrous state.

The functioning of this improved apparatus is such that it does not require water dissolution of the alkali or ingredients and neither does it require the employment of heat sufficiently high to melt the alkali when in the anhydrous state.

Considering the apparatus in connection with the production of dry granular alkali silicates the functioning is such that dry silica and some suitable relatively dry solid commercial form of $Na_2O$, such as caustic alkali or caustic soda, may be quickly reacted by heat at a temperature below the melting point of the caustic alkali and without its water dissolution and in a continuous manner with a resulting product of exceptionally high purity and uniformity. An example of an alkali silicate adaptable for production in the approved apparatus here described is orthosilicate.

The construction of the apparatus is such that a mixture stream of alkali and silica is constantly advanced at a determined rate through the reaction chamber and subjected throughout such advance to heat whereby the active chemical reaction occurs within the intermediate portion or length of the mixture stream and results in the production of dry granular flowable alkali silicate.

The construction of the apparatus is such that preceding the development of the active chemical reaction the mixture is advanced shut off from exposure to the atmosphere or to the products of combustion and is therefore prevented from picking up carbon dioxide. Throughout the active chemical reaction zone portion of the chamber the mixture is exposed to discharge vapor products of reaction into the atmosphere. During such active chemical reaction stage the carbon dioxide will not be picked up by the mixture because of its active giving off of vapor and heat.

The construction of my improved apparatus is such that when the alkali reaction product leaves the reaction chamber it is in a dry granular form. It may be anhydrous or it may contain some water of crystallization. Its purity and uniformity may be accurately and easily controlled with my improved apparatus.

Figures 3, 4:
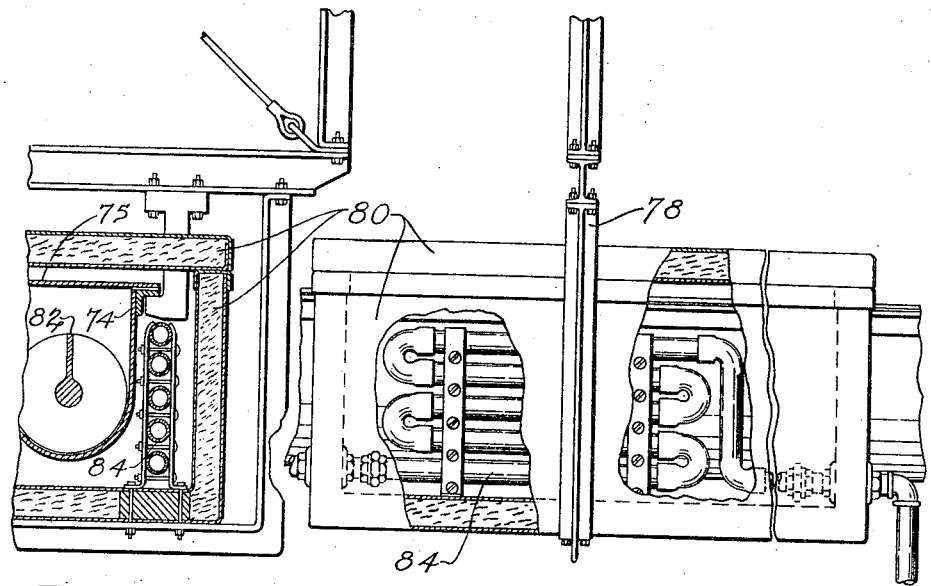
Figure 2:
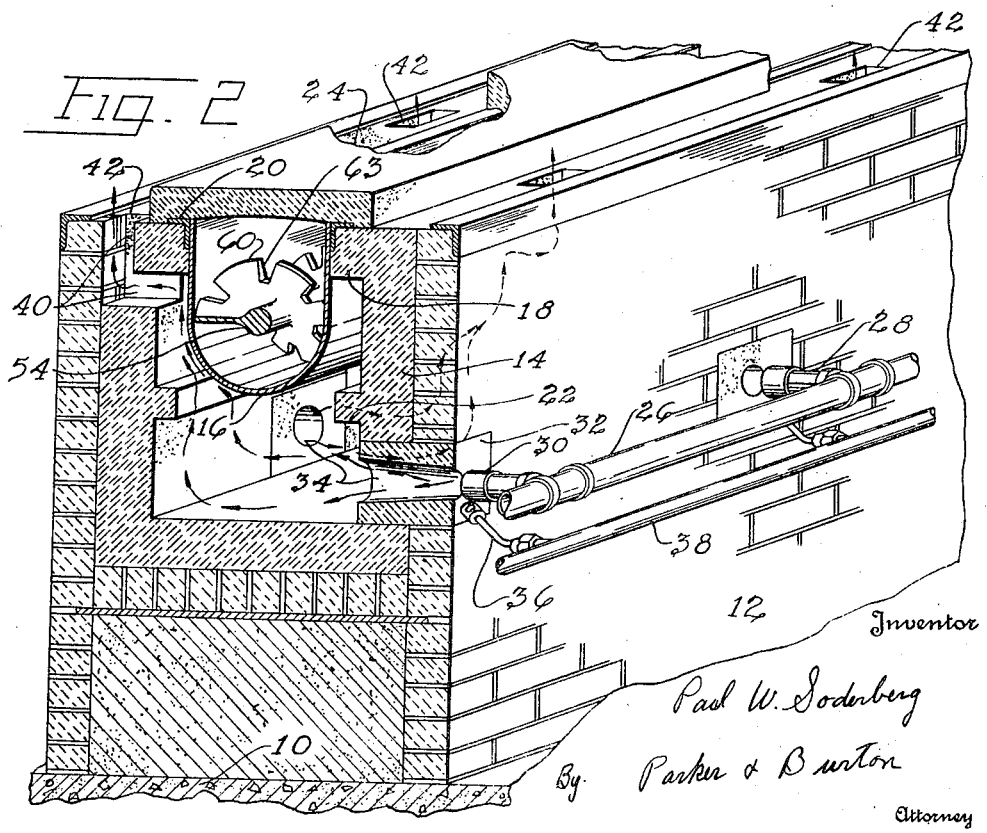

Other objects, advantages, and meritorious features of this invention will more fully appear from the following specification, appended claims, and accompanying drawings, wherein:

Figure 1 illustrates a preefrred embodiment of my improved alkali reaction chamber apparatus, Fig. 2 is a perspective and vertical cross section taken on line 2—2 of Fig. 1, Fig. 3 is a vertical cross section partly broken away taken on line 3—3 of Fig. 1, and Fig. 4 is a side elevation partly broken away of a fragment of a construction shown in the lower half of Fig. 1.

The apparatus illustrated is one which has been found particularly suitable and comprises a longitudinal alkali reaction chamber through which the material to be reacted is advanced as a continuously moving stream. The ingredients which go to make up the reaction product are admitted at one end of the chamber and moved therethrough for discharge from the opposite end. The advance of these materials is accompanied by continuous stirring or mixing thereof and is also accompanied by heat to which the materials are subjected throughout their advance. The rate of advance and the temperature to which the materials are heated depend upon the character of the ingredients and the desired dryness of the reaction product. The reaction chamber is of sufficient length so that, consistent with the heat applied, the rate of advance of the mixture and the character of the ingredients, the chemical reaction occurs throughout the intermediate portion of the chamber length.

In Figs. 1 and 2 there is shown a supporting floor 10. Mounted on this floor 10 is an enclosure indicated generally by the numeral 12. This enclosure may be formed of brick or other suitable refractory material. The enclosure is here illustrated as being of substantial length and as generally of a rectangular shape in cross section. Its construction appears more clearly in Fig. 2. In Fig. 2 it will be noted that the upper portion is lined with a suitable refractory liner 14 which supports a trough-shaped element formed of metal and indicated as 16.

The liner is provided along its upper edges with a ledge 18 which directly supports the trough through the employment of angle irons 20 secured to opposite sides of the trough. The liner is provided with longitudinally extending ribs 22 so spaced with respect to the bottom of the trough 16 as to direct the flames of combustion entering the combustion chamber below the trough closely along the bottom and over the side walls of the trough. The side walls of the trough are spaced from the side walls of the liner 14 so as to provide what might be termed a trough or tunnel like reaction chamber having hollow side walls. The bottom of the trough 16 is exposed to the combustion chamber space therebelow.

Along each side of the brick work there extends a fuel mixture manifold pipe 36 which leads from a suitable source of fuel supply, such as a mixture of gas and air. This manifold pipe is provided with a plurality of spaced apart fuel mixture feed pipes 28. Each of said pipes has a discharge nozzle 30 disposed to project a fuel mixture stream into and through the flaring fuel passageway 34 formed in refractory block 32 within the wall of the enclosure as shown in Fig. 2. A pilot feed pipe 38 extends along the fuel mixture pipe 26 and is provided with a plurality of pilot discharge outlets 36 which are disposed to ignite the fuel mixture discharged from the fuel nozzles 30 as shown in Fig. 2.

It will be seen that the blasts of burning gas directed from the flaring apertures 34 travel from each side across the combustion chamber spaced underneath the bottom of the trough 16 and pass upwardly against the opposite side wall of such trough and out through angular discharge passageways 40. The actual outlet from each such angular passageway is indicated as 42 of Fig. 2. These outlets are spaced beyond the edge of the cover plate 24. Each discharge outlet 40 is substantially opposite a flaring inlet 44 through the opposite side wall. The outlets on opposite sides of the chamber and the inlets on opposite sides thereof are preferably staggered with respect to each other as indicated. As the flames of combustion are projected into the combustion chamber from the inlets 34 they travel across the chamber over the bottom and opposite side wall of the trough 16 and out through discharge outlets 40 in the opposite side wall of the combustion chamber. Staggered as to opposite sides they pass across the combustion chamber from opposite sides over the bottom of the reaction chamber trough and over both side walls. The rib or ledge 22 on the side wall of the combustion chamber from which the flames are emerging prevents such flames from rising directly upwardly and discharging through the discharge outlets 40 on such side. The rib 22 on the opposite side wall of the combustion chamber directs the flames toward the trough to travel closely over the bottom and side wall thereof.

As this reaction chamber is particularly designed for the reaction of chemicals, such as caustic alkali, which absorb carbon dioxide from the surrounding atmosphere the forward portion of the trough preceding the active chemical reaction zone section is provided with a cover plate 24. Such cover is provided with a flap valve 24 (Fig. 1) that drops within the trough as shown to ride over the advancing mixture stream. This cover and flap valve form a protective enclosure for the forward portion of the trough 16 preventing the mixture of ingredients being passed therethrough from taking carbon dioxide from the atmosphere or from picking up products of combustion discharged through discharge outlets 42 which are hereinafter described.

The forward portion of the reaction chamber as heretofore described is covered and the ingredients passed therethrough are protected from exposure to the atmosphere. The intermediate portion of the reaction chamber is shown in Fig. 2 as exposed to discharge vapor products of reaction directly into the atmosphere. It is within this intermediate portion that the active chemical reaction occurs. Preferably this intermediate zone is left uncovered as shown in Fig. 1 though means might be provided to conduct the vapor products of reaction to some remote point. The tail end portion of the reaction chamber may be provided with a cover plate 24 if desired. As it is this portion of the reaction chamber within which dehydration is completed and the temperature is very high, having been raised substantially by the active chemical reaction, the heat given off is generally such as to prevent the mixture here picking up carbon dioxide from the atmosphere and this tail portion of the chamber should have a discharge to the atmosphere to facilitate dehydration.

In Fig. 1 it will be noted that the metal trough 16 extends beyond each end of the brick work which encloses the combustion chamber. At the forward end there is arranged a hopper 44 into which the ingredients that go to make up the mixture may be discharged through a pipe 46. At the discharge end there is a hopper 68 into which the trough discharges as hereinafter described.

The hopper has an outlet 48 within which is positioned a conveyor such as a rotatable screw conveyor that feeds the material from the hopper into a vertical discharge pipe 50 from where it discharges into the end of the trough 16. This screw conveyor is of any suitable conventional type and may be driven through a chain drive 52 which is in turn connected up with a shaft 54 which is provided with drive mechanism 56 that in turn is coupled with other driving mechanism 58 that may lead to an electric motor or any other source of suitable power in a manner which is well understood. The shaft 54 extends into and lengthwise through trough 16. It carries an impelling screw 60 which is cut away at intervals so that it will mix the material being advanced by it. There may be three cut outs in each flight of the screw. These are shown in Figs. 1 and 2 and indicated as 63.

The mixing advancing screw may be formed in sections as is shown in Fig. 1 where the forward section is driven from the mechanism heretofore described and terminates at a bearing 64 intermediate the length of the trough and the after section is driven from suitable drive mechanism indicated generally as 66 which may be driven from any suitable source of power not shown. Due to the fact that the reaction chamber is of substantial length it is preferable to separate the screw into two sections so as to get a drive on each end. Furthermore, the rate of advance may be varied as between the two sections as is found desirable.

It is desirable to regulate the rate of advance of the mixture through the forward covered end portion of the reaction chamber so that the active chemical reaction occurs only throughout the intermediate portion of the chamber which is exposed to discharge vapor products of reaction into the atmosphere.

If desired a cooling chamber section may be provided such as is illustrated in Fig. 1 suspended underneath the floor 10.

The trough 16 discharges at its after end into a hopper 68 which in turn discharges through an outlet 70 into a hopper 72 that feeds into a trough like structure 74 which extends through the enclosure 76 of the cooling chamber which is supported by brackets 78 below the floor 10. A cross section of this enclosure is shown in Fig. 3 and a broken away portion in Fig. 4. The enclosure has bottom and side walls indicated as 80 and a top wall identified by the same numeral. An interrupted screw impeller 82 similar to the screw impeller 54 extends through the trough 74. The trough 74 may be provided with a cover 75 as shown in Fig. 3.

The wall of the enclosure is an insulated wall and fluid cooling pipes 84 are arranged within the enclosure on opposite sides of the trough and convey cooling fluid from any suitable source of supply so as to produce a circulating cooling medium about the trough whereby the mixture may be rapidly cooled so as to be packaged for commercial distribution directly upon discharge from the apparatus.

The trough 74 is shown in Fig. 1 as broken away at the discharge end and this broken away portion is shown as discharging into a hopper 88 which feeds through an outlet 90 into any suitable container such as barrel 92. It is apparent that if it were desired the cooling section need not be used and the hopper 68 might discharge directly into a receptacle wherein the reaction product might be carried away and stored to be later packaged for shipment. It will be noted that the cover plate 24 at the forward end of the reaction chamber is provided with a flap valve element 25 which bears on the mixture stream and said portion of the mixture stream is thereby shut off from exposure to the atmosphere.

In carrying out my invention materials which go to make up the ultimate reaction product are discharged through the pipe 46 into the hopper 44 and fed by means of the screw conveyor through the pipes 48 and 50 into the trough 16. They are advanced through this trough by the screw 60 which screw because of the cut outs exerts a constant mixing action on the materials throwing them outwardly toward the wall of the trough and stirring them continually as they pass along the length of the trough. The rate of advance may be accurately regulated by regulating the rotation of the screw through a suitable control providing for its rotation which may be of any conventional kind. In one apparatus which has been found suitable the reaction chamber has a length of approximately fifty feet and the product may be passed therethrough in twenty or thirty minutes. The rate of advance through the reaction chamber can, of course, be used to control the relative amount of moisture of crystallization permitted to remain in the reaction product and in combination with the amount of heat to which the chamber is subjected will control the time at which the active chemical reaction will occur.

In the manufacture of orthosilicate one formula involves the use of 25–30% $SiO_2$; in the form of finely divided silicate flour of particularly high purity and the admixture therewith of 75–70% respectively, of powdered caustic soda. This mixture when it reaches the temperature of approximately 175° C. which is substantially below the melting point of caustic soda results in a violent chemical reaction and the apparatus is so constructed that this reaction will occur within the intermediate uncovered portion and the vapor products of reaction will be discharged into the atmosphere. If desired a hood might be provided over this uncovered portion discharging at a remote point into the atmosphere. During this chemical reaction the mixture goes through the state of a pasty plastic mass into the form of a granular substance which, with the constant mixing of its continuing advance through the after portion of the chamber, ultimately takes the form of a relatively finely divided product which is flowable as a dry powdered orthosilicate. The reaction is an exothermous one and the temperature is raised above 175° C.

It will be noted that the reaction occurs within an intermediate portion of the reaction chamber. As the mixture continues through the after portion of the chamber the heat is continued and the heat is such that the mixture attains a temperature greater than that accompanying the chemical reaction and approximating 250° to 300° C.

If an anhydrous product is to be produced this temperature in the after portion of the chamber is necessary because of the strong affinity of the alkali and the alkali silicate for water. The greater the percentage of water in the original mixture the more necessary this application of heat in the after portion of the reaction chamber becomes to bring the product to the anhydrous state. Whether water is used in the original mix or not the water formed by the reaction makes it necessary to continue the heating of the mixture following such reaction in order to produce an anhydrous product.

The heat can be controlled so as to give a finished product which is anhydrous or one which contains any desired amount of moisture. In the apparatus shown the mixture is subjected to a substantially constant temperature throughout the length of the reaction chamber but the temperature of the mixture does not attain its maximum until some time after it has passed through the active chemical reaction shown. In the after portion of the chamber it may attain a temperature of approximately 300° C.

It has been found that by covering the forward portion of the reaction chamber the material is prevented from absorbing carbon dioxide from the atmosphere and a product of exceptionally high purity results. Carbon dioxide will not be taken up through the uncovered portion because of the violent chemical reaction going on and the discharge of vapor products at high temperature therefrom. It is believed desirable that the after portion of the reaction chamber also be covered and this is here shown.

If it is desired to cool the product for immediate packaging the operation may be continued through the cooling chamber portion underneath the floor, the operation of which has hereinabove been described.

In addition to orthosilicate it is of course possible to produce many other reaction products in the apparatus shown. For example the apparatus may be used to produce pyrophosphate out of disodium phosphate. Various other alkali silica mixtures may be produced in a similar manner. One mixture found suitable involves the use of silica, powdered caustic and trisodium phosphate. To produce the different reaction products the speed of advance and rate of feed and heat will be regulated as found necessary. The mixture of materials entering the reaction chamber may also include a certain proportion of hydrated caustic in the mix if such is found desirable. Reference has been made to such a mixture hereinbefore.

What I claim:

1. In an alkali reaction chamber, a linear trough shaped reaction chamber supported interiorly within a linear trough shaped combustion chamber spaced from the bottom and side walls thereof, said combustion chamber having a plurality of outlet openings for products of combustion at the top along opposite sides of the reaction chamber, said combustion chamber having a plurality of fuel mixture inlet openings through opposite side walls, means adapted to direct fuel streams through the inlet openings through each side wall of the combustion chamber to travel thereacross under the bottom of the reaction chamber and up over the opposite side wall of the reaction chamber for dischcarge from the combustion chamber through the outlet openings along such side, means for advancing the mixture of materials to be reacted through said reaction chamber and subjecting them to a mixing operation during such advance, means for protecting the forward end portion of the reaction chamber within which the mixture is heated prior to the active reaction from the exposure to the atmosphere, said means including a cover and a flap valve, said reaction chamber having its intermediate portion within which the active chemical reaction occurs open to discharge vapor products of reaction directly into the atmosphere, an intake at one end to receive ingredients to be advanced therethrough, and a discharge outlet at the opposite end for the discharge of granular reaction product.

2. In an alkali reaction chamber, a linear trough shaped reaction chamber supported within a linear trough shaped combustion chamber spaced from the bottom and side walls thereof, said combustion chamber having a plurality of outlet openings for products of combustion at the top along opposite sides of the reaction chamber, said combustion chamber having a plurality of fuel mixture inlet openings through opposite side walls, means which directs fuel mixture streams through said inlet openings into the combustion chamber to travel thereacross adjacent the bottom of the reaction chamber and up over the side wall opposite the inlet opening and for discharge through the outlet openings along such side, each side wall of the combustion chamber provided with a longitudinally extending flame deflecting baffle ledge projecting interiorly from the side wall above the fuel mixture inlet openings toward the reaction chamber but terminating spaced therefrom, and means for advancing a mixture of materials through said reaction chamber and subjecting them to a mixing operation during such advance, said reaction chamber having an intake at one end to receive ingredients to be advanced therethrough for reaction therein and having a dischcarge outlet at the opposite end for the discharge of the granular product of reaction.

3. In an alkali reaction chamber, a linear trough shaped reaction chamber supported interiorly within a linear trough shaped combustion chamber spaced from the bottom and side walls thereof, said combustion chamber having a plurality of outlet openings for products of combustion at the top along opposite sides of the reaction chamber and spaced therefrom, said combustion chamber having a plurality of fuel mixture inlet openings through its side walls, means which directs fuel mixture streams through said inlet openings into the combustion chamber to travel thereacross over the bottom of the reaction chamber and up over the opposite side wall of the reaction chamber for discharge through the outlet openings on such side of the combustion chamber, mixture advancing means extending through the reaction chamber and operable to advance a mixture of materials therethrough and to mix the same during such advance, a cover extending over the forward end portion of the reaction chamber trough within which the mixture passing therethrough is heated prior to the active chemical reaction, the intermediate section of the reaction chamber trough wherein the active chemical reaction occurs being uncovered for a substantial portion of its length, said reaction chamber having an intake at one end to receive ingredients received therethrough for reaction therein and having a discharge outlet at the opposite end for the discharge of the granular product of reaction, said mixture advancing means having that portion within the covered section of the chamber operable to vary the rate of advance of the mixture as compared with the mixture advance through the remainder of the chamber.

4. In reaction chamber apparatus of the character described, a linear trough shaped reaction chamber having a hollow bottom and hollow side walls, means for directing a plurality of combustion flames from each of the two opposite sides of the trough across the hollow bottom of the trough at points spaced along the length thereof, means extending along each hollow side wall for directing said flames upwardly through the oppositely disposed hollow side wall of the trough, said hollow side walls being provided with discharge openings for said combustion flames, said flame directing means being so relatively arranged as to stagger the flames directed from one side with respect to the flames directed from the opposite side, rotatably supported screw mechanism extending lengthwise through the trough adapted to simultaneously mix and advance materials discharging into one end of the trough throughout the trough for discharge from the opposite end thereof.

5. In a reaction chamber apparatus of the character described, a linear trough-shaped combustion chamber, a linear trough-shaped reaction chamber supported within the combustion chamber spaced from the bottom and side walls thereof, each side wall of the combustion chamber having a plurality of fuel mixture inlet openings therethrough, said inlet openings being spaced apart linearly along such side wall below the reaction chamber, each side wall of the combustion chamber provided with a baffle ledge extending linearly therealong above the fuel mixture inlet openings and projecting interiorly of the combustion chamber from such side wall to a point adjacent to but spaced from the reaction chamber, means for projecting fuel mixture streams through said inlet openings in each side wall of the combustion chamber to be directed by its baffle ledge to travel over the bottom of the reaction chamber toward the opposite side wall and over the baffle ledge of said wall into the space between the side wall of the reaction chamber and the side wall of the combustion chamber, each combustion chamber side wall provided with outlets for products of combustion, which outlets extend angularly from the inner face of the side wall spaced above its baffle ledge outwardly and upwardly through the top of the outer face of the side wall and spaced from the reaction chamber.

PAUL W. SODERBERG.